United States Patent
Ahrens

(10) Patent No.: US 7,593,907 B2
(45) Date of Patent: Sep. 22, 2009

(54) METHOD FOR FORECASTING EARTHQUAKES: BASED ON P-RING JUNCTIONS FROM SEED EARTHQUAKES WITH TECTONIC PLATE EDGES AND MAJOR FAULT LINES

(75) Inventor: Steven Everett Ahrens, Fairmont, WV (US)

(73) Assignee: Caitlin J. Ahrens, Fairmont, WV (US)

( * ) Notice: Subject to any disclaimer, the term of this patent is extended or adjusted under 35 U.S.C. 154(b) by 416 days.

(21) Appl. No.: 11/677,039

(22) Filed: Feb. 20, 2007

(65) Prior Publication Data

US 2008/0201119 A1    Aug. 21, 2008

(51) Int. Cl.
G06E 1/00    (2006.01)
G06E 3/00    (2006.01)

(52) U.S. Cl. .............................. 706/21; 706/20; 706/45
(58) Field of Classification Search .................. None
See application file for complete search history.

(56) References Cited

U.S. PATENT DOCUMENTS

| | | | |
|---|---|---|---|
| 4,656,867 A | 4/1987 | Sasaki | |
| 4,825,165 A | 4/1989 | Helms et al. | |
| 5,270,649 A | 12/1993 | Laukien | |
| 5,625,348 A | 4/1997 | Farnsworth et al. | |
| 5,675,088 A * | 10/1997 | Serata | ........................ 73/784 |
| 5,742,166 A | 4/1998 | Park | |
| 6,246,964 B1 | 6/2001 | Blaunstein | |
| 6,288,396 B1 * | 9/2001 | Qiang et al. | ............ 250/339.14 |
| 6,373,396 B2 | 4/2002 | Zamfes | |
| 6,389,361 B1 | 5/2002 | Geiser | |
| 6,704,658 B2 | 3/2004 | Kawashima | |
| 6,714,873 B2 | 3/2004 | Bakulin et al. | |
| 6,728,640 B2 | 4/2004 | Mandal et al. | |
| 6,823,963 B2 | 11/2004 | Albertini et al. | |
| 6,870,482 B2 | 3/2005 | Cherry | |
| 6,873,265 B2 | 3/2005 | Bleier | |
| 6,985,817 B2 | 1/2006 | Saenz Alvarado | |
| 7,277,797 B1 * | 10/2007 | Kunitsyn et al. | ............... 702/15 |
| 2002/0103603 A1 | 8/2002 | Kawashima | |
| 2004/0172196 A1 * | 9/2004 | Alvarado | ........................ 702/2 |

OTHER PUBLICATIONS

Jones et al., L., "Short-Term Earthquake Hazard Assessment for the San Andreas Fault in Southern California", 1991.*

* cited by examiner

*Primary Examiner*—David R Vincent
*Assistant Examiner*—Adrian L Kennedy

(57) ABSTRACT

A hereditary model illustrates a method devised to extrapolate a series of locations of probable progeny earthquake events based on previous "seed" earthquakes. Shadow Zone border P-rings are claimed as precursors to possible future earthquake event locations. The intersection of these P-rings with tectonic plate edges or major fault lines indicates future seismic event targets. The earth physics that underlie the behavior of this forecast method involves the interaction of the refracted P-waves with internal earth processes.

16 Claims, No Drawings

METHOD FOR FORECASTING EARTHQUAKES: BASED ON P-RING JUNCTIONS FROM SEED EARTHQUAKES WITH TECTONIC PLATE EDGES AND MAJOR FAULT LINES

FIELD OF INVENTION

The present invention relates to a method of short term forecasting of moderate to large size earthquakes. More particularly the present invention relates to a short-term earthquake forecasting method for determining the epicenter or hypocenter, and a relative magnitude within a 100-hour period of a forecasted earthquake from a seed earthquake event.

BACKGROUND AND PRIOR ART REFERENCES

Every earthquake that occurs is viewed to have a seed event. Under a hereditary model, the possible progeny from that seed will lie on one of three P-rings. Our definition of a P-ring is the ring that forms by the refracted P waves (infrasonic sound waves) of a seismic event. The P-rings at the shadow zone boundaries of the core of the Earth and a smaller inner compression ring comprised of multiple P-rings are the rings used in this method. The forecasted locations of probable quake events are derived from the intersections of P-rings, plate edges and fault lines and are called "Refracted Earthquake Locations (REL)". These possible event locations are the result of the bent passage of P-waves through the liquid outer core of the Earth. The degree angles and the corresponding widths of our 3 P-rings were determined using historical earthquake data locations. Shadow zone border rings numbers 1 and 2 has a width of one and a half degrees and the compression ring 3 also has a one and a half degree width. The progeny quakes, if they occur, will occur beneath either P-ring 1, 2, or 3. The ring widths are no more than 105 miles or 169 km. A 0.5-degree buffer is allowed for a ripple in the rings due to refraction irregularities. An alert is declared when a P-ring intersects a tectonic plate edge or major fault line. An alert clock lasts for 100 hours from the seed event. If an earthquake occurs, the clock does not expire until the entire 100 hours has elapsed and the quake then also becomes a new seed with its' own set of rings.

Multiple alerts for a specific geographic location can occur from multiple seeds; and converging rings, and multiple clocks may be in play at any time. In our software version of the forecasting method, we also include in our database an archive of the coordinates of the past 100 days of quake events and a listing of active volcanoes. The epicenter of the actual quake is the surface expression of the forecasted hypocentral location. The 0.5 degree buffer zone allows for a fuzziness or corrugated ripple in the shadow edges as a result of the distortion of refracted P-waves through the earth.

Earthquake prediction is a debatable topic (Mogi, 1969). There are at least three types of (conventional) earthquake prediction. Deterministic prediction is the behavior exhibited before the earthquake (the stress interactions with the surrounding rocks) can be calculated (by whatever techniques are currently available) so that the time, place, and magnitude of the future large earthquakes can be estimated within well-defined windows (Di Luccio et al., 1997). Earth is a complex, non-linear and heterogeneous system at all scales which makes deterministic prediction difficult. Statistical prediction is where seismicity in the past can yield estimates of seismicity in the future. Statistical analysis of seismicity in the past, in order to attempt to predict future behavior, again fails because of complexity and heterogeneity. The third and most common type is where some key precursory phenomenon or a group of phenomena indicate that a large earthquake is imminent (Agnew and Jones, 1991). Traditional thought suggests that all three types cannot predict time, place, and magnitude of a future large earthquake. It is complexity and heterogeneity that prevents it each time. It is widely accepted that body and surface waves are contemporaneous with and define earthquakes and cannot be used for forecasting. Our hypothesis assumes that most earthquakes are produced by other earthquakes, and that the infrasonic body waves form an acoustical conduit for mantle convection or some other earth process to take place and point to where future earthquakes will occur. Previous methods did not take this into account.

The dispersion properties of P-waves as they relate to the interface between the earth's mantle and its core have been accepted as forming a shadow zone from approximately 103 degrees to 142 degrees according to USGS Theoretical P-wave arrival time charts.

The ring widths and angles are as follows:
Ring 1: 102.4-103.9
Ring 2: 142.6-144.1
Ring 3: 145.1-146.6

The REL fall within a very small area of error, and have a time constraint for their validity. The magnitudes of the resulting quakes tend to decrease markedly after a certain period of time within the time constraint of 100 hours. A quake most likely will not occur unless it has been subjected to a specific P-ring within a previous 100-hour period. The hypothesis postulates that most earthquakes are the result of a previous earthquake. We state that most earthquakes can be accounted for; however, there may be a few orphan events that have no discernable parent event.

Existence of this precursor is not sufficient to say without a doubt that an earthquake will occur, but as in a weather forecast, the conditions are ripe for a quake to occur. Very few quakes have been found in the past 24 months of NEIC data that did not fit this pattern. A seed event can be found in most every case and is very obvious once the method is routinely performed.

Historically, very few successful examples of earthquake prediction have been consecutively reproducible. The employment of this method, however, will yield a high success rate in a very short time span. All of the alerts together occupy only a fraction of the planets total tectonic plate edges or major fault lines in space and time. We do not pretend to understand the science of what causes the earthquake, but do believe that our method of forecasting is based upon a sound method of pattern recognition.

If earthquakes nucleate as a result of seed events halfway across the globe as the pattern seems to indicate, then what process or phenomenon would cause this to happen? Should the triggering of mainshock events be examined from an entirely different view and does the aftershock phenomenon also have to be considered in a different light? Using this forecasting method, many aftershocks can be accounted for as separate earthquake events. Only if a secondary quake occurs in less than 28 minutes could it possibly be assumed to be an aftershock. 28 minutes is the minimum amount of time required for a round-trip reflection from P-ring number 1 at approximately 103 degrees, which assumes a P-wave travel time of 14 minutes one-way. If indeed the P-waves are responsible for the reflected quake event, then it could be deduced that the P-waves provide an acoustical conduit or path that allows the invigorated mantle to convect. The mantle convection would thus cause pressure beneath the plates at the desired ring location.

Geographically some locations are at a crossroads of these rings due to the seismically active regions throughout the world. The recognition of this ring pattern makes it clear to understand the high seismicity of areas such as Indonesia, Japan, California, and New Zealand and Alaska. They all trade ring reflections in what we call symmetry of heredity or seismic revenge.

What is claimed is:

1. A mathematically accurate implemented method for accurately forecasting the hypocenter of a future earthquake, by calculating three rings of P-wave activity, which are derived from a mainshock or seed earthquake event. The method of calculating the rings is comprised of the steps:
   (a) determine epicenter coordinates to include latitude and longitude in decimal format of the seed event;
   (b) begin 100 hour clock time-frame based on seed event time in UTC format;
   (c) obtaining and plotting refracted P-ring #1 at 102.4 to 103.9 degrees from seed event;
   (d) obtaining and plotting refracted P-ring #2 at 142.6 to 144.1 degrees from seed event;
   (e) obtaining and plotting refracted P-ring #3 at 145.1 to 146.6 degrees from seed event;
   (f) plotting hypocenters of forecasted quake events based on ring plots obtained in steps (c), (d) & (e), by calculating the intersections or junctions of the P-rings with tectonic plate edge locations or major fault line coordinates with a 0.5 degree (35 mile) buffer allowed for a ripple in the ring due to refracted wave irregularities;
   (g) estimate magnitude of forecasted event locations based on historical seismicity, and multiple ring crossings within the 100 hour clock time-frame;
   (h) disregard intersections of rings and plate edges or faults that are in remote uninhabited regions for alert notifications;
   (i) forecast intersections of P-rings and tectonic plate edges and major fault lines in inhabited regions as possible earthquake event locations for next 100 hours;
   (j) forecast intersections with previous coordinates from archived seismic events of past 100 days that may or may not have been on a plate edge but yet seismically active;
   (k) send an alert notification to geographical areas that fall within the intersections of steps (i-j) that an earthquake is possible for next 100 hours based on seed event of said time and date.

2. A method according to claim 1, wherein all earthquakes are possible seed events and every earthquake that occurs is viewed to have had a seed event.

3. A method according to claim 1, wherein the forecasted earthquakes are within a 100 hour time-frame from the seed event.

4. A method according to claim 1, wherein the seed event is any earthquake that has been recorded and reviewed by a seismologist for accuracy.

5. A method according to claim 1, wherein the P-rings are plotted using steps (c), (d) & (e) to determine the refracted infrasonic waves of the seed event of said degree angle and width to estimate the hypocenter of a forecasted earthquake that would fall on those ring parameters.

6. A method according to claim 1, wherein said earthquake location is forecasted for hypocentral determination based on ring and plate and fault intersections.

7. A method according to claim 1, wherein the tectonic plate edges and major fault lines are identified as current known locations.

8. A method according to claim 1, wherein the forecast of the magnitude of the progeny earthquake can vary, determined by the seismicity of a particular location, and is generally a magnitude of equal or less than that of the mainshock or seed event unless there are multiple P-ring crossings at the same forecasted location within the 100 hour period from multiple seeds.

9. A method according to claim 1, wherein the angular distance north or south from the earth's equator is the latitude that is expressed in degrees.

10. A method according to claim 1, wherein the angular distance east or west from a meridian that runs between north and south poles and passes through Greenwich, England is the longitude that is expressed in degrees.

11. A method according to claim 1, wherein focal depth is the depth of focus where the earthquake originates.

12. A method according to claim 1, wherein origin time is the time at which earthquake begins and is expressed in UTC.

13. A method according to claim 1, wherein the measure of energy released during the occurrence of an earthquake is the magnitude.

14. A method according to claim 1, wherein the on-line estimation of the hypocenter of the seed event is obtained by telemetered earthquake seismic wave data.

15. A method according to claim 1, wherein a future earthquake and the epicenter is measured accurately up to 100 hours in advance from a previous mainshock or seed event.

16. A method according to claim 1, wherein said method is used to forecast short term earthquakes triggered by a seed event at a location of which fit the parameters of ring 1, 2, or 3 as described in (c, d, & e) that influence the fluids or other internal earth processes at hypocentral depth due to refracted P-wave activity and its consequences.

* * * * *